(12) United States Patent
Live et al.

(10) Patent No.: US 12,693,219 B2
(45) Date of Patent: Jul. 28, 2026

(54) LENSLESS SURFACE PLASMON RESONANCE INSTRUMENT

(71) Applicant: Les instruments scientifiques affinités inc., Montreal (CA)

(72) Inventors: Ludovic Live, Toronto (CA); James Wei, Waterloo (CA)

( * ) Notice: Subject to any disclaimer, the term of this patent is extended or adjusted under 35 U.S.C. 154(b) by 182 days.

(21) Appl. No.: 18/283,557

(22) PCT Filed: Mar. 30, 2022

(86) PCT No.: PCT/CA2022/050484
§ 371 (c)(1),
(2) Date: Sep. 22, 2023

(87) PCT Pub. No.: WO2022/204814
PCT Pub. Date: Oct. 6, 2022

(65) Prior Publication Data
US 2024/0151644 A1 May 9, 2024

Related U.S. Application Data

(60) Provisional application No. 63/169,172, filed on Mar. 31, 2021.

(51) Int. Cl.
*G01N 21/552* (2014.01)
(52) U.S. Cl.
CPC ..... *G01N 21/553* (2013.01); *G01N 2201/062* (2013.01); *G01N 2201/0683* (2013.01); *G01N 2201/08* (2013.01)

(58) Field of Classification Search
CPC .......... G01N 21/553; G01N 2201/062; G01N 2201/0683; G01N 2201/08; G01N 2201/0627; G01N 2201/0813; G01N 2201/0833
USPC ....................................................... 356/445
See application file for complete search history.

(56) References Cited

U.S. PATENT DOCUMENTS

2002/0109841 A1* 8/2002 Gould ...................... G01J 3/18
356/318
2003/0035972 A1* 2/2003 Hanson ................... B32B 7/023
428/912.2
2003/0151743 A1* 8/2003 Fernando ............. G01N 21/253
356/319
(Continued)

FOREIGN PATENT DOCUMENTS

JP 2000346845 A 12/2000

*Primary Examiner* — Md M Rahman

(57) ABSTRACT
A surface plasmon resonance (SPR) instrument is provided, in which light from one or more broad spectrum LEDs is sequentially passed through corresponding apertures directly into a Dove prism. Upon entering the Dove prism the light is refracted onto a surface of the prism against which an SPR sensor is attached, then internally reflects off the surface to a third surface of the Dove prism. Upon exiting the Dove prism the light is again refracted so as to be collinear with the emitted light. The light is collected by an optical fiber, passed through a filter, and conveyed to a detector. The wavelength-angle combination at which SPR occurs is found by using broad spectrum LEDs and a fixed angle. The use of apertures and the omission of collimating lenses allows a more compact SPR instrument than traditional SPR instruments.

3 Claims, 4 Drawing Sheets

(56)                    References Cited

U.S. PATENT DOCUMENTS

2003/0191379 A1 *  10/2003  Benaron  .............  A61B 5/0084
                                                          600/323
2010/0078546 A1      4/2010  Chung
2016/0354016 A1 *  12/2016  Benaron  ...........  A61B 5/14546

* cited by examiner

LENSLESS SURFACE PLASMON RESONANCE INSTRUMENT

FIELD OF INVENTION

This invention relates to surface plasmon resonance instruments.

BACKGROUND

Surface plasmon resonance (SPR) sensing is a widely used technique for the measurement of adsorption of material onto planar metal surfaces, and is used in many biosensor applications. Briefly, SPR relies on optical excitation of conduction electrons at the interface between negative and positive permittivity materials stimulated by incident light. Resonance occurs when the light is in total internal reflection at a wavelength-angle combination that matches a wavevector of the surface plasmon. This matching can be achieved in a number of ways.

One way is to beam monochromatic light at a variety of incident angles so as to determine the angle of resonance. Many SPR instruments are based on this angle interrogation configuration. However, these instruments are expensive and cannot be deployed in the field due to the length of the optical path within the optical configuration needed for angle interrogation. Another reason for the large size of angle interrogation based instruments is the spectral resolution of the instrument. The resolution is dependent on either the scanning speed of the incident angle range or on the size of a linear array of photodiodes onto which the reflected light is focused. The former requires slow measurement and complex mechanisms, whereas the latter requires precise alignment and lengthy optical paths, both of which increase the size and expense of the SPR instrument.

Another way of performing SPR sensing is to use multiwavelength light. The wavelength-angle combination at which resonance occurs is found by varying the wavelength while keeping the angle fixed. U.S. Pat. No. 8,982,353 teaches an SPR instrument which uses an SMA collimating lens to collimate broadband light into a beam of light which enters a Dove prism. The collimated beam is refracted upon entering the Dove prism and is incident on a surface of the prism, to which an SPR sensor is attached, at a single angle. The light beam undergoes total internal reflection, and the reflected light beam is refracted once more upon exiting a third surface of the prism. An inverted SMA collimating lens collects the light exiting the Dove prism and passes it to a spectrophotometer. Alternatively, the collected light can be used to illuminate a camera, such as a CCD camera, for use in SPR imaging. At least the lens which collimates the light before entering the prism and the prism itself are aligned on a single optical axis. The configuration taught by U.S. Pat. No. 8,982,353 provides a more portable instrument than devices based on angle interrogation.

However, it would be desirable to further miniaturize the SPR device and reduce the cost of the instrument. This would provide a less expensive and more portable SPR device.

SUMMARY

According to one embodiment of the invention, an SPR instrument is provided having an LED holder, a sample holder, a polarizing filter, an optical fiber holder, and a spectrophotometer. The LED holder comprises an LED and an LED aperture through which light emitted by the LED leaves the LED holder. The sample holder is next to the LED holder with no intervening optical components between the sample holder and the LED holder. The sample holder comprises an entry aperture aligned with the LED aperture and an exit aperture. The polarizing filter is next to the exit aperture. The optical fiber holder comprises an optical fiber aligned with the exit aperture, such that the polarizing filter lies between the exit aperture and the optical fiber. The optical fiber leads to the spectrophotometer.

In one embodiment the LED holder has at least one additional LED, each at least one additional LED having a corresponding additional LED aperture. The sample holder has a corresponding additional entry aperture aligned with the additional LED aperture and a corresponding additional exit aperture. The optical fiber holder has a corresponding additional optical fiber aligned with the additional exit aperture. The optical fiber and the at least one additional optical fiber merge onto a collection fiber bundle. The collection fiber bundle leads to the spectrophotometer.

According to another embodiment of the invention, a method of performing SPR analysis is provided. Light is generated using a broad spectrum LED. The light is passed through an LED aperture directly to an entry aperture in a sample holder, the LED aperture and the entry aperture being aligned. The light is passed from the entry aperture into a prism having a thin metal layer against one wall of the prism. The light reflected by the thin metal layer and refracted by an exit surface of the prism is passed to an exit aperture. Light leaving the exit aperture is collected at an optical fiber, and is guided along the optical fiber to a spectrophotometer.

By propagating light with a broad spectrum along apertures directly to a Dove prism, an SPR instrument can be made which does not use collimating lenses. This reduces the path length and the expense of the SPR instrument, allowing for simpler field use or even less expensive desktop use.

BRIEF DESCRIPTION OF THE DRAWINGS

The features and advantages of embodiments of the invention will become more apparent from the following detailed description of the preferred embodiment(s) with reference to the attached figures, wherein.

It is noted that in the attached figures, like features bear similar labels.

DETAILED DESCRIPTION OF THE PREFERRED EMBODIMENTS

Figure 1:
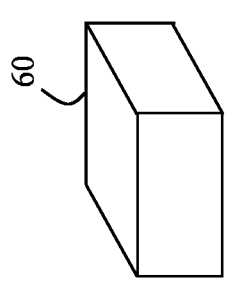
FIG. 1 shows a perspective view of an SPR instrument according to one embodiment of the invention.
Figure 1:
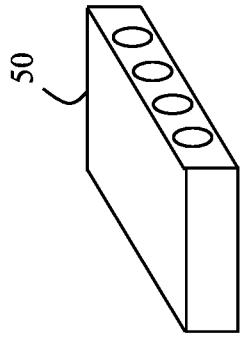
Figure 1:
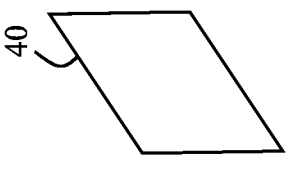
Figure 1:
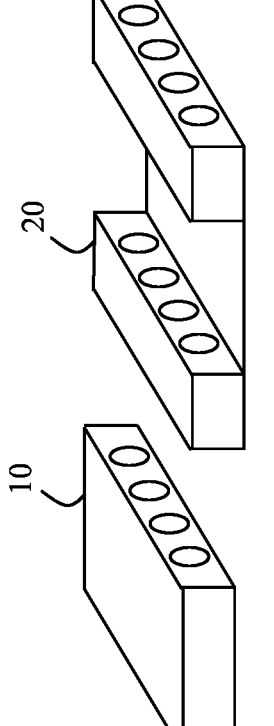

Referring to FIG. 1, an SPR instrument according to one embodiment of the invention is shown. The SPR instrument comprises an LED holder 10, a sample holder 20 next to the LED holder 10, a polarizing filter 40 on the opposite side of the sample holder 20 from the LED holder 10, an optical fiber holder 50 on the opposite side of the polarizing filter 40 from the sample holder 20, and a spectrophotometer 60. One or more optical fibers are held by the optical fiber holder and merge into a single collection fiber bundle leading to the spectrophotometer, but for clarity these optical fibers are not shown in FIG. 1. The SPR instrument is free of optical components, such as collimating lenses, between the LED holder 10 and the sample holder 20.

Figure 2:
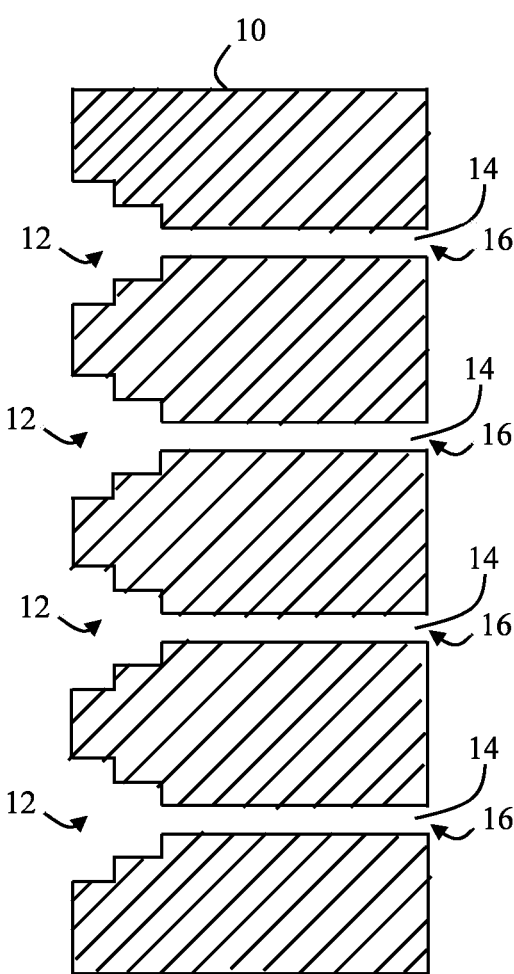
FIG. 2 shows a top view cross-section of the LED holder of FIG. 1 according to one embodiment of the invention.

Referring to FIG. 2, the LED holder 10 according to one embodiment of the invention is shown. The LED holder 10 is composed of opaque material. The LED holder has at least one LED tunnel 14. Four LED tunnels are shown in FIG. 2 and the invention will be depicted hereinafter as having four LED tunnels, but more generally there is at least one LED tunnel 14. The exact number depends on the number needed for a specific application. Commonly, there are four or eight LED tunnels for bioapplications. Each LED tunnel 14 has a corresponding LED aperture 16 through which any light in the LED tunnel 14 leaves the LED holder 10.

Within the LED holder 10 each LED tunnel 14 has a corresponding LED accommodating space 12 into which an LED can be placed. When an LED (not shown in FIG. 2) is placed in the LED accommodating space 12, the head of the LED abuts the LED tunnel 14 and the legs of the LED protrude from the LED holder 10. The length of the LED tunnels 14 will depend on the design of the instrument. Longer tunnels help reduce the emission cone of light emanating from the corresponding aperture, but this must be balanced against the desire for miniaturization of the instrument as a whole, including the LED holder 10. A total length of the LED accommodating space and of the LED tunnel of 19.4 mm was used in one embodiment.

The diameter of the LED tunnels 14 cannot be greater than the diameter of the head of the LEDs. In one embodiment LEDs of 3 mm diameter were used and the diameter of the LED tunnels 14 was 2 mm. The diameters could be smaller however, such as to further miniaturize the instrument and/or to increase the number of channels.

Figure 3:
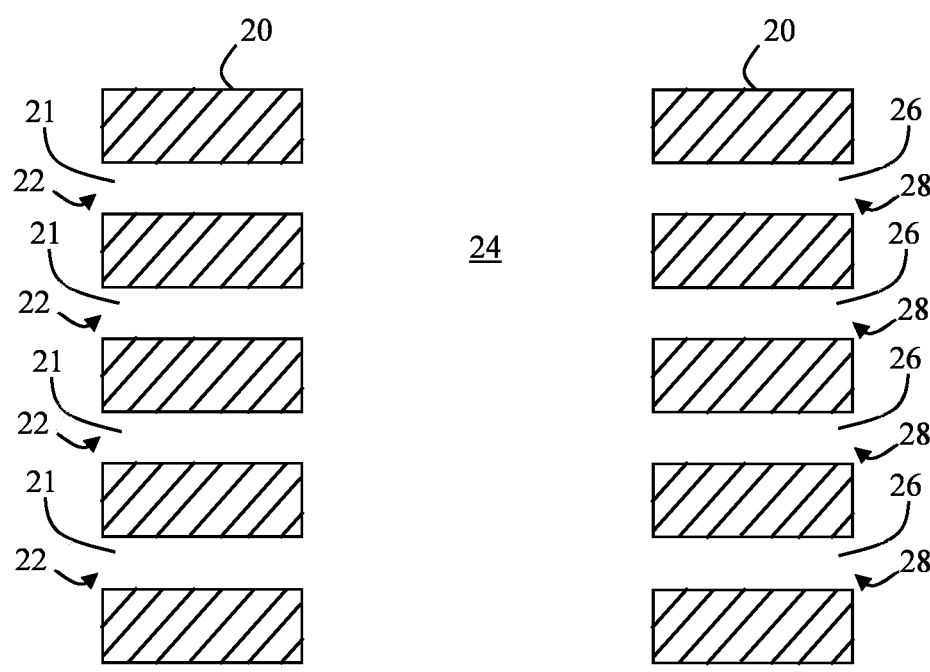
FIG. 3 shows a top view cross-section of the sample holder of FIG. 1 according to one embodiment of the invention.

Referring to FIG. 3, the sample holder 20 according to one embodiment of the invention is shown. The sample holder 20 is composed of opaque material. The sample holder 20 includes at least one entry aperture 22. The at least one entry aperture 22 is aligned with a corresponding one of the at least one LED aperture 16 in the LED holder 10. Each of the at least one entry aperture 22 leads to a corresponding at least one entry tunnel 21. Each of the at least one entry tunnel 21 is aligned with the corresponding LED tunnel 14. The sample holder 20 includes a space 24 into which a Dove prism can be placed. The sample holder 20 includes at least one exit tunnel 26. Each of the at least one exit tunnel 26 is aligned with a corresponding one of the at least one entry tunnel 21. The sample holder 20 is preferably an integral piece. Any light traveling along one of the at least one exit tunnel 26 leaves the sample holder from a corresponding exit aperture 28.

The polarizing filter 40 is a basic linear polarizer mounted on a motor that is rotated to filter light in an S or P orientation in reference to the metal film plane of the SPR sample in the sample holder.

Figure 4:
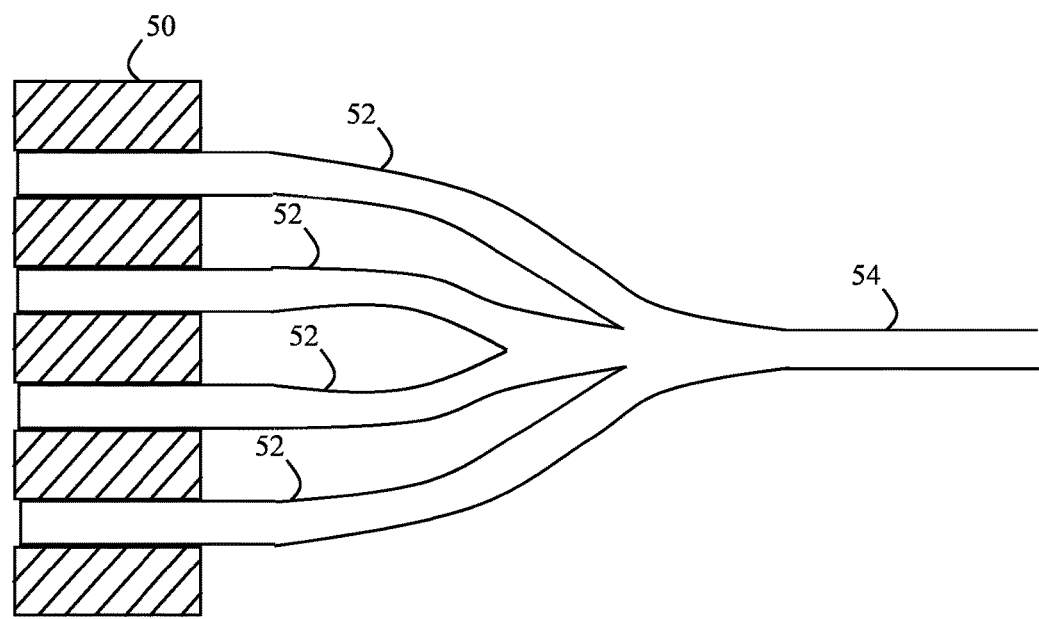
FIG. 4 shows a top view cross-section of the optical fiber holder of FIG. 1 according to one embodiment of the invention.

Referring to FIG. 4, the optical fiber holder 50 according to one embodiment of the invention is shown. The optical fiber holder 50 contains at least one optical fiber 52, each of the at least one optical fiber 52 corresponding to and aligned with a corresponding one of the at least one exit aperture 28 in the sample holder 20. Each of the at least one optical fiber 52 within the optical fiber holder 50 emerges from the optical fiber holder 50 and merges into a single collection fiber bundle 54.

Broadly, in operation when an LED within the LED holder 10 is fired, light from the LED travels down a tunnel. The light leaves the LED holder 10 and enters an aperture within the sample holder 20. Within the sample holder 20, the light travels down a tunnel, enters a Dove prism within the sample holder, is refracted towards a surface of the Dove prism against which an SPR sensor is placed, and is internally reflected towards an exit surface of the Dove prism. Upon exiting the Dove prism the light is refracted onto the same optical alignment as when it left the LED holder 10 and passes through the polarizing filter 40, which filters out the S-component of the light. The polarized light enters an optical fiber within the optical fiber holder 50, merges onto a collection fiber bundle, and is guided to the spectrophotometer 60.

According to one embodiment of the invention, broad spectrum LEDs are placed in the LED accommodating spaces 12. The spectrum of the LEDs is preferably in the VIS-NIR region (400 nm to 700 nm). This provides flexibility to excite the plasmon of gold (633 nm) and of silver (525 nm). This also allows work with either thin films or with a nanoparticle format. The LEDs may all have the same spectrum, but more generally may have different spectra, which may or may not overlap.

The LEDs are fired sequentially, such that light from each LED in turn travels down the corresponding tunnel 14 and enters a Dove prism. The method of the invention will be described hereinafter with reference to one LED, but it is to be understood that if there is more than one LED in the SPR instrument then the method is carried out sequentially as each LED is fired in turn. Light leaves the LED and the LED holder 10 and enters a corresponding aperture 22 in the sample holder 20 and travels down an entry tunnel 21. If a Dove prism with a thin metal film on a sample surface is placed in the sample holder 20, then light from the LED enters the Dove prism at an entry surface and is refracted towards the sample surface. The light undergoes total internal reflection at the sample surface and is reflected towards an exit surface. At the exit surface the light is refracted upon leaving the Dove prism and travels down an exit tunnel 26 aligned with the entry tunnel 21.

The Dove prism is configured to fit in the sample holder, and may be provided separately from the SPR instrument.

The light leaves the sample holder 20 through one of the exit apertures 28 and passes through the polarizing filter 40. After passing through the polarizing filter 40 the light is collected by an optical fiber 52 within the optical fiber holder 50. Light entering the optical fiber travels on to the collection fiber bundle 54, which guides the light to a spectrophotometer 60. Of course, if there is only one LED accommodating space, there need only be one optical fiber 52 and there will be no collection fiber bundle. Rather, the single optical fiber 52 will lead directly to the spectrophotometer 60.

The invention has been described as using a Dove prism placed within the sample holder 20. More generally, any prism with a 45 degree face towards the LEDs can be used. Even more generally, a prism with an angle facing the optical fiber different from 45 degrees can be used, but then the optical design will not be on the same plane and the optical fibers within the optical fiber holder would have to be at an angle to accommodate that. If the angle of incidence is different than 45 degree, then SPR could still be possible but the angle and location of the exit apertures within the sample holder would have to be adapted accordingly.

The embodiments presented are exemplary only and persons skilled in the art would appreciate that variations to the embodiments described above may be made without departing from the spirit of the invention. The scope of the invention is solely defined by the appended claims.

We claim:

1. A surface plasmon resonance (SPR) instrument comprising:
   an LED holder comprising an LED and an LED aperture through which light emitted by the LED leaves the LED holder;
   a sample holder next to the LED holder with no intervening optical components between the sample holder and the LED holder, the sample holder comprising an entry aperture aligned with the LED aperture and an exit aperture;
   a polarizing filter next to the exit aperture;
   an optical fiber holder comprising an optical fiber aligned with the exit aperture, such that the polarizing filter lies between the exit aperture and the optical fiber; and
   a spectrophotometer to which the optical fiber leads.

2. A surface plasmon resonance (SPR) instrument comprising:
   an LED holder comprising an LED and an LED aperture through which light emitted by the LED leaves the LED holder;
   a sample holder next to the LED holder with no intervening optical components between the sample holder and the LED holder, the sample holder comprising an entry aperture aligned with the LED aperture and an exit aperture;
   a polarizing filter next to the exit aperture;

an optical fiber holder comprising an optical fiber aligned with the exit aperture, such that the polarizing filter lies between the exit aperture and the optical fiber;
   a spectrophotometer to which the optical fiber leads; and
   at least one additional LED, each at least one additional LED having:
      a corresponding additional LED aperture;
      a corresponding additional entry aperture aligned with the additional LED aperture;
      a corresponding additional exit aperture; and
      a corresponding additional optical fiber aligned with the exit aperture; and
   a collection fiber bundle into which the optical fiber and the at least one additional optical fiber merge, the collection fiber bundle leading to the spectrophotometer.

3. A method of performing surface plasmon resonance (SPR) analysis, comprising:
   generating light using a broad spectrum LED;
   passing the light through an LED aperture directly to an entry aperture in a sample holder, the LED aperture and the entry aperture being aligned;
   passing the light from the entry aperture into a prism having a thin metal layer against one wall of the prism;
   passing light reflected by the thin metal layer and refracted by an exit surface of the prism to an exit aperture;
   collecting light leaving the exit aperture at an optical fiber; and
   guiding the light along the optical fiber to a spectrophotometer.

* * * * *